Patented Dec. 22, 1931

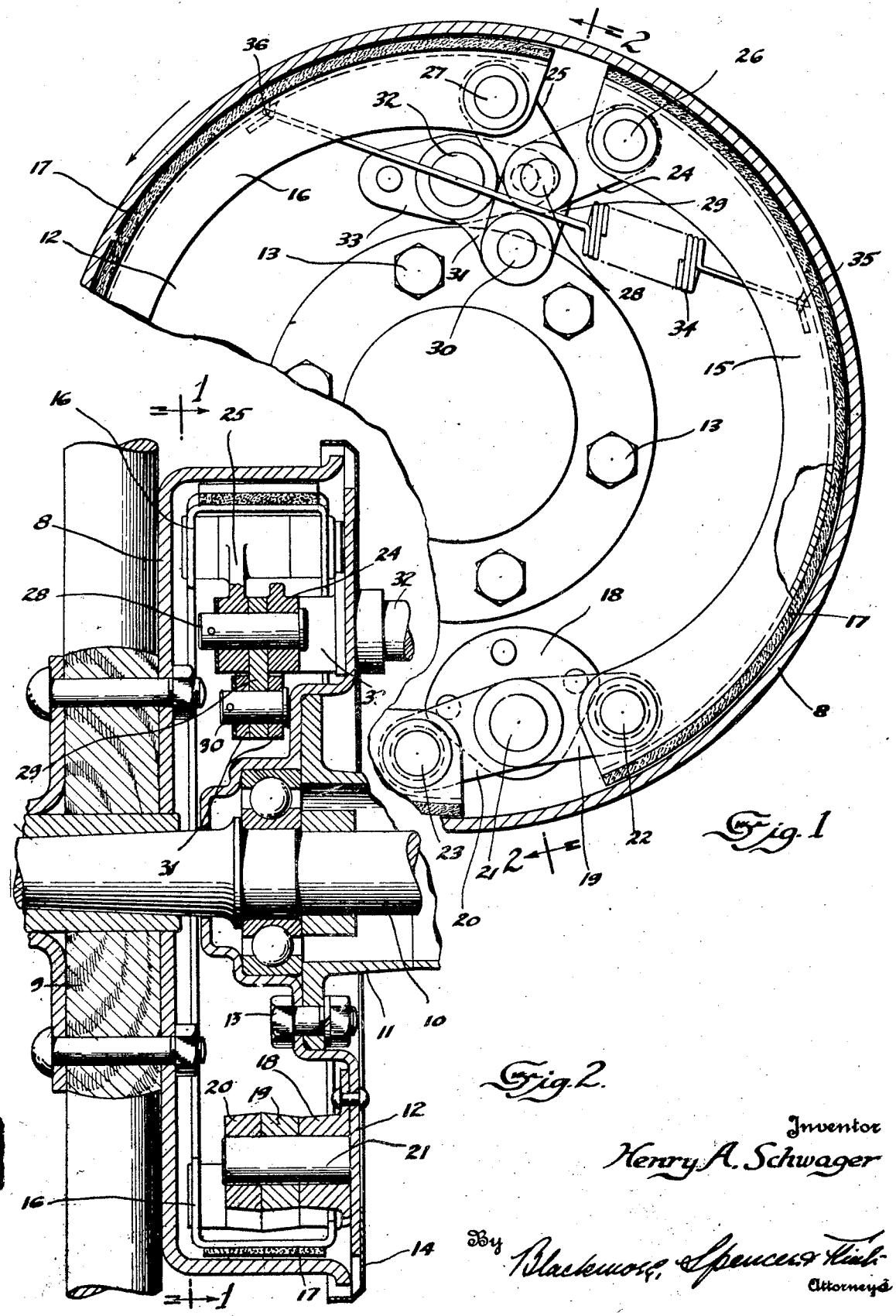

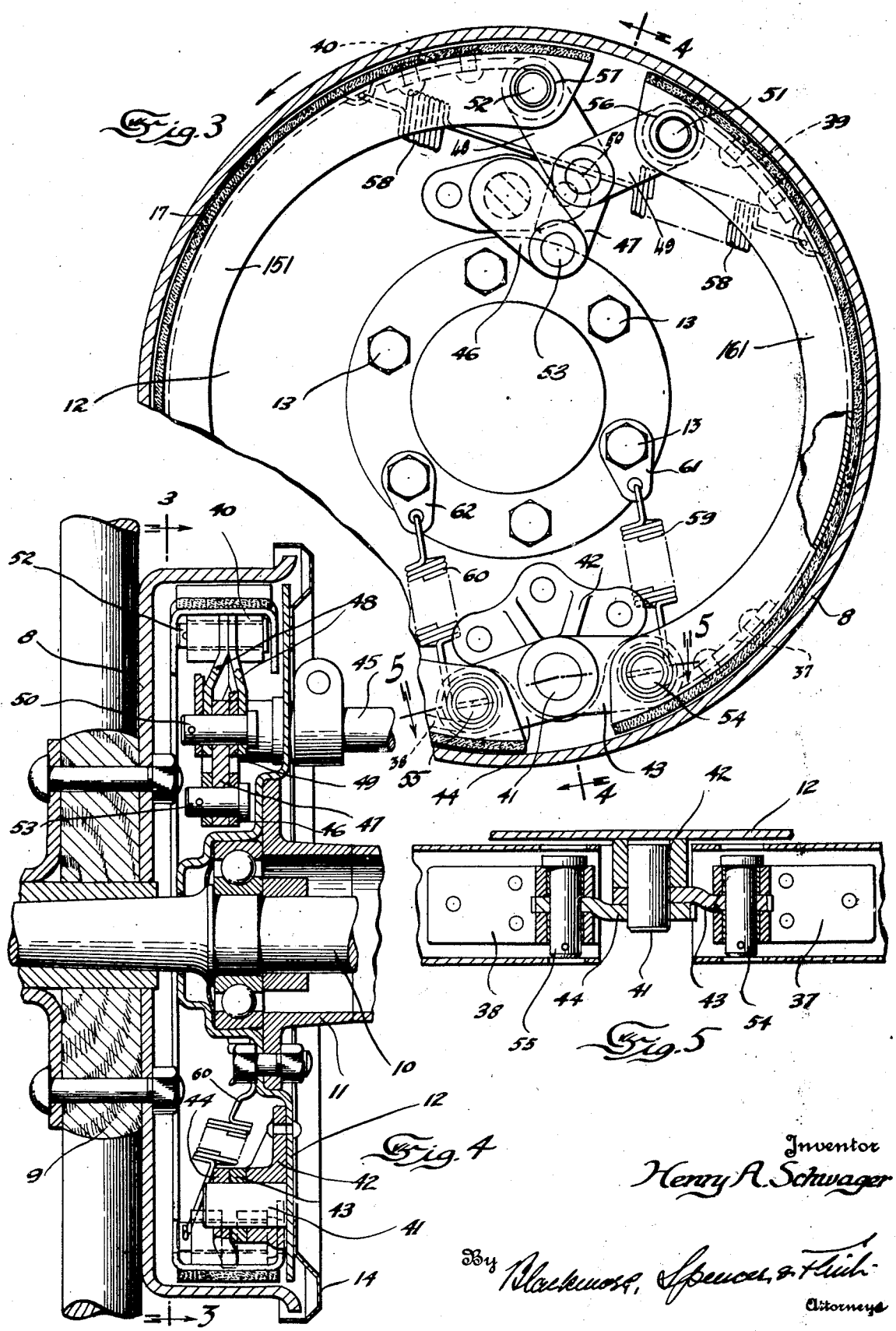

1,837,681

UNITED STATES PATENT OFFICE

HENRY A. SCHWAGER, OF ROYAL OAK, MICHIGAN, ASSIGNOR TO GENERAL MOTORS CORPORATION, OF DETROIT, MICHIGAN, A CORPORATION OF DELAWARE

TWO SHOE BRAKE MECHANISM

Application filed July 13, 1927. Serial No. 205,507.

My invention relates to brake mechanism for motor driven vehicles of the type wherein brake shoes arranged within a brake drum fastened to a wheel of the vehicle are forced outward and into frictional engagement with the interior of the drum, and the object of my invention is to provide a more effective brake of the type above mentioned; such increased efficiency being due to certain features of construction hereinafter described whereby the forward movement of the vehicle acts to supplement the force transmitted to the shoes by and through the usual brake applying mechanism, to thereby force them into more firm engagement with the drum than they can be forced by the brake applying mechanism by itself and acting alone.

With the above and other objects of invention in view my invention consists in the improved brake mechanism illustrated in the accompanying drawings, described in the following specification, and particularly claimed; and in such obvious modifications and variations of the particular device illustrated and described as come within the scope of the concluding claims.

In the drawings accompanying and forming a part of this specification and wherein the preferred embodiment of my invention is illustrated:

Figure 1 is a view showing my improved brake mechanism in side elevation as seen from a plane indicated by the line 1—1, Figure 2, the brake drum being shown in section upon said plane.

Figure 2 is a view showing a section upon planes parallel to the axis of the brake drum and wheel, and indicated by the irregular line 2—2, Figure 1.

Figure 3 is a view similar to Figure 1, upon a plane indicated by the line 3—3, Figure 4, showing my invention modified as to certain parts thereof.

Figure 4 is a view of the form of my invention shown in Figure 3, upon planes indicated by the broken line 4—4, Figure 3.

Figure 5 is a fragmentary view showing a section upon a plane indicated by the line 5—5, Figure 3.

In the drawings, the reference numeral 8 designates a brake drum of the usual form which is fastened to a wheel 9 upon the end of a shaft 10 which drives the wheel, and which shaft extends through the rear axle housing 11 of ordinary form; that is, my invention is illustrated in connection with brake mechanism for a rear wheel of a vehicle. The numeral 12 designates a non-rotatable disc which is arranged across the open end of the brake drum and supports the brake shoes and the means for forcing them into engagement with the inner surface of the brake drum, this disc being substantially the same in both the forms of my invention illustrated. The disc is shown as fastened to the end of the axle housing by bolts 13; and a guard 14 is preferably provided to keep mud and dust from getting into the interior of the brake drum, as is usual in brake mechanism for motor driven vehicles.

Arranged within the brake drum 8 and adapted to contact therewith are two brake shoes 15, 16; one being longer circumferentially of the drum, than the other, as shown. These shoes are channel shaped in cross section, and of rigid construction. They are shown as provided with the usual friction material facings 17 which engage the inner surface of the brake drum when the brakes are applied, to thereby retard movement of the vehicle. The shoe 16 is made longer than the shoe 15 so that, the direction of rotation when the vehicle is moving forward being as indicated by the arrows, the first mentioned shoe which is subjected to the greater amount of wear in normal braking operations has the greater area; whereby the shoes, or rather their friction faces, wear out more uniformly than would otherwise be the case.

The brake shoes 15, 16 are connected to the brake disc 12 through a bracket 18 fastened thereto, and two links 19, 20 which are pivotally connected with a pin 21 carried by the bracket. The lower ends of the shoes are connected with the outer ends of the links 19, 20 through pivotal connections at 22, 23; whereby the bracket 18 provides an abutment for preventing the shoes from moving the drum, and for resisting the thrust of the shoes when the brakes are applied, as will be understood. These links are inclined to a substantial degree so as to permit a certain amount of circumferential movement of the shoe 15; and so that like circumferential movement of the shoe 16 will cause said shoe 16, and particularly its lower end to be forced outward and into more intimate contact with the interior of the brake drum.

The upper ends of the brake shoes are pushed apart to force them into engagement with the inner surface of the drum 8 by links 24, 25 which are pivotally connected with the shoes at 26, 27; and which are pivotally connected with one another by a pin 28, thereby providing a toggle connection between the upper ends of the shoes. This pin 28 provides a pivotal connection between adjacent ends of the links 24, 25 and the upper end of a third link 29, the lower end of which last mentioned link is pivotally connected at 30 between the free ends of a bifurcated arm 31 fast upon the outer end of an oscillating shaft 32, which is supported by a bearing 33 carried by the disc 12; wherefore and upon angular movement being imparted to the shaft through any suitable brake applying mechanism the arm 31 swings upward and the ends of the brake shoes are forced apart through the links 29, 24 and 25, as will be understood. Furthermore and as will be appreciated the linkage as a whole is free to move circumferentially of the drum; so that circumferential movement of the shoe 15, which is permitted by the link 19, is transmitted through the linkage to the shoe 16, and link 20 to the abutment 18; thus wedging such last mentioned shoe outward and against the interior of the drum, because of the inclined arrangement of said link 20. The upper ends of the shoes are drawn toward one another and held away from the drum by a spring 34 the ends of which are connected with the shoes at 35, 36.

In the form of my invention illustrated in Figures 1 and 2 the bearings for the ends of the pivot pins 22, 23, 26 and 27 are provided by bosses formed integrally with the side walls of the shoes as they are cast, whereas in the form illustrated in Figures 3 to 5 separate brackets 37, 38, 39 and 40 are riveted to the shoes and have bearings for the equivalent pins. The brackets 37, 38 in this form of my invention and, therefore, the lower ends of the shoes are pivotally connected with an abutment made up of a pin 41 and a supporting bracket 42 fastened to a disc 12, through links 43, 44; the links, pin and bracket being in all essential particulars the same as the link 19, 20, the pin 21 and the bracket 18 in the form of my invention first described herein.

Likewise the brake applying shaft 45 is substantially the same as the shaft 32, and the arm 46 thereof is bifurcated like the arm 31 to receive the lower end of a link 47 corresponding with the link 29.

The connections between the upper ends of the link 47 and the upper ends of the brake shoes in this second form of my invention are, however, through four toggle links instead of two; two links, both numbered 48, being provided for the shoe 151 on the left and two numbered 49 for the shoe 161 on the right; and the lower ends of all four links are pivotally connected with the upper end of the link 47 by a pivot pin 50. The outer ends of the links 48 and 49 lie in slots provided for them in the brackets 39 and 40, and are pivotally connected with said brackets by pivot pins 51, 52. The lower end of the link 47 is pivotally connected with the free end of the arm 46 by a pin 53; and the outer ends of the links 43, 44 at the lower ends of the shoes with the brackets 37 and 38 by pins 54, 55, as will be understood.

The side walls of the brake shoes in this second form of my invention are provided with holes, as best shown in Figure 5, so that the pins 54, 55 may be put in place; and similar holes 56 and 57 are provided for the pins 51 and 52 to pass through in assembling the brake mechanism.

In this second form of my invention the spring 58 is substantially the same as the spring 34; and in addition thereto two other springs 59, 60 are provided for holding the lower ends of the shoes away from the brake drum, the upper ends thereof engaging lugs 61, 62 held under the heads of bolts 13 which fasten the brake disc 12 to the axle housing 11, and the lower ends thereof hooking through holes in or otherwise engaging the pins 54, 55, thus acting also to hold the pins in place in the bearings provided for them in the brackets 37 and 38.

In view of the premises and upon movement being communicated to the shaft 32 so as to swing the arm 31 upward and lift the link 29, it will be appreciated that the toggle formed by the links 24, 25 will be straightened; and the upper parts of the shoes forced upward and outward and into frictional engagement with the interior of the brake drum.

The links 19, 20 between the lower ends of the shoes and the abutment pin 21 are arranged so that they incline downward; from which it follows, assuming forward movement as indicated by the arrow, that in addition to the contact with the drum produced by the toggle links the frictional engagement between the right hand shoe 15 and the drum tends to move that shoe circumferentially along with the drum, this being permitted by the inclination of the link 19; which movement acting through the toggle links forces the left hand shoe 16 into engagement with the drum by power due to forward movement of the vehicle; the link 20, because of its inclined arrangement, acting to force the lower end of the shoe 16 into more firm engagement with the drum as the shoe moves slightly with the drum, due to the action of the right hand shoe thereupon through the toggle link. The shoes are therefore forced into engagement with the drum in two ways; first by the action of the toggle mechanism itself acting to force the upper ends of the shoes apart and, secondly, by circumferential movement of the shoe 15 permitted by the link 19 and transmitted to the shoe 16 through the toggle mechanism, which movement of the said shoe 16 causes it to be forced outward, because of the inclination of the link 20. In the brake mechanism herein there is therefore a substantial amount of "servo" action, as it is commonly called, wherein power derived from the movement of the vehicle is utilized in part to force the shoes into engagement with the drum; such action being secured, however, in a two shoe brake in which one shoe in addition to its normal braking action acts also to force the other against the drum with more force than that due solely to the brake applying mechanism whereby both shoes are forced into engagement with the interior of the brake drum.

Having thus described and explained my invention I claim and desire to secure by Letters Patent:

1. In brake mechanism of the class described and in combination with a rotatable brake drum, and a non-rotatable disc arranged adjacent the open end of said drum; two brake shoes arranged within said drum and adapted to engage the inner surface thereof, and both of which are capable of slight movement in the direction of rotation of the drum; brake applying mechanism located adjacent the upper ends of said shoes, and which is capable of slight movement in the direction of rotation of the drum, for forcing the upper ends of said shoes apart and into frictional engagement with the interior of said drum, and through which mechanism circumferential movement of one of said shoes may be communicated to the other; an abutment carried by said disc and located adjacent the lower ends of said shoes; and means co-operating with said abutment and with the lower end of the other of said shoes for forcing said other shoe outward and into more intimate contact with the interior of said brake drum.

2. In brake mechanism of the class described and in combination with a rotatable brake drum, and a non-rotatable disc arranged adjacent the open end of said drum; two brake shoes arranged within said drum and curved to conform with the interior thereof, and both of which are capable of slight movement in the direction of rotation or circumferentially of the drum; toggle mechanism carried by said disc and located adjacent the upper ends of said shoes, and which mechanism is capable of slight movement in the direction of rotation of the drum, for forcing the upper ends of said shoes apart and into frictional engagement with the interior of said drum, and through which mechanism circumferential movement of one of said shoes may be communicated to the other; an abutment carried by said disc and located adjacent the lower ends of said shoes; and means cooperating with said abutment for forcing the other of said shoes outward and into more firm engagement with the interior of said brake drum.

3. In brake mechanism of the class described, a brake drum; two brake shoes cooperating therewith and both of which are capable of slight movement in the direction of rotation of said drum; brake applying mechanism for forcing both said shoes into frictional engagement with said drum and through which mechanism circumferential movement of one of said shoes is communicated to the other, and means whereby circumferential movement of the other of said shoes results in the forcing thereof into more firm engagement with said brake drum.

4. In brake mechanism of the class described, a brake shoe curved in form and channel shaped in cross section; brackets secured within and to the bottom wall of said shoe adjacent the ends thereof; and pivot pins carried by said bracket for connecting the shoe with links of the brake mechanism, the side walls of the shoe having holes larger than and located in line with said pivot pins.

In testimony whereof I affix my signature.

HENRY A. SCHWAGER.